United States Patent [19]
Godard

[11] 3,735,234
[45] May 22, 1973

[54] APPARATUS FOR RECHARGING AN EMERGENCY BATTERY

[75] Inventor: Pierre Godard, Tremblay-les-Gonesse, France

[73] Assignee: Societe des Accumulateurs Fixes et de Traction, Romainville, France

[22] Filed: Apr. 26, 1972

[21] Appl. No.: 247,684

[30] Foreign Application Priority Data

Apr. 30, 1971 France.................................7115676

[52] U.S. Cl.......................................320/44, 320/22
[51] Int. Cl................................................H02j 7/04
[58] Field of Search..................320/43–45, 37, 38, 31, 32, 20, 22; 307/66

[56] References Cited
UNITED STATES PATENTS 3,356,922 12/1967 Johnston............................320/40 X
3,421,067 1/1969 Wilson et al............................320/14

Primary Examiner—J. D. Miller
Assistant Examiner—Robert J. Hickey
Attorney—Francis T. Carr et al.

[57] ABSTRACT

Battery emergency charging device comprising a memory accumulator charged with an intensity proportional to the battery discharge intensity, characterized in that the discharge circuit of the memory accumulator comprises means for making the memory accumulator discharge intensity proportional to the battery charge intensity.

9 Claims, 3 Drawing Figures

Patented May 22, 1973

APPARATUS FOR RECHARGING AN EMERGENCY BATTERY

SUMMARY OF INVENTION

The present invention relates to a device for recharging an emergency storage battery.

The problem which arises in such a device is the following:

In an emergency circuit, when the distribution system fails, the electric energy is supplied to a load, which may be an emergency equipment, by a storage battery, called an emergency battery. For example, the load may be a lighting device. When a breakdown occurs in such system, the load is supplied with electric energy by the emergency storage battery, which discharges during the time corresponding to the duration of the breakdown. When the supply system becomes operative again, the storage battery is automatically put on charge again. Recharging of the battery at a low rate may then be effected but the complete recharging of the battery then takes a very long time, and a new emergency operation of the battery may not be possible if a fresh breakdown occurs within a short time after the first, since the battery has not yet been sufficiently recharged.

For this reason, there is generally provided a device for effecting the rapid charging of the battery, the object of which is to give the battery as complete a charge as possible in a short time.

It is then necessary, however, for the recharging device to be associated with means for avoiding overcharging of the battery, by supplying to the latter a quantity of electricity corresponding to that which has been discharged from it before the recharge occurs.

There has been proposed earlier a device for charging a storage battery which serves for the emergency supply to a load in the event of failure of a normal supply circuit, comprising an alternating-current supply system associated with a charger having input terminals connected to the said alternating-current supply system and output terminals connected to the said battery, the said charger having a high charging rate and a low charging rate, a memory accumulator of small capacity in relation to that of the storage battery, said memory accumulator, adapted to be charged by the storage battery during periods of failure of the alternating-current supply and controlling, during the time of its discharge in a discharge circuit, the rapid charging rate of the storage battery. This device comprises means for producing a voltage proportional to the current supplied by the battery to the load, an electronic direct current amplifier for amplifying this voltage, and means for converting it into a direct charging current, the intensity of which is proportional to the said voltage, regardless of the value of the latter, the said direct charging of said memory accumulator being effected proportionally to the current fed out by the storage battery, and only when the latter feeds into the load.

Such a device generally operates satisfactorily, but it is attended by disadvantages in some cases. Thus, when the voltage of the supply system varies, while all other conditions remain unchanged, a variation of the intensity of the charging of the storage battery occurs in the absence of current regulation. Since the duration of the charging of the battery at the high rate is determined by the duration of the discharge of the memory accumulator, there may occur either an overloading of the storage battery, if the voltage of the supply system in the course of the charge is higher than the rated voltage, or an insufficiency of the charge of the storage battery if the voltage of the supply system in the course of the charge is lower than the rated voltage. Since the variations in the intensity of the charge of the battery may reach and even exceed ± 20 percent, depending upon the charging circuit employed, when the voltage of the supply system varies by ± 10 percent, this may result in damage to the storage battery overloaded at a heavy rate or in insufficient independence of the incompletely charged storage battery depending upon the circumstances.

Likewise, the intensity of the charging of the storage battery is a function of the voltage of the battery itself. The device described in the foregoing does not make it possible to regulate the charging time of the storage battery as a function of the voltage of the battery, and this may result in the same disadvantages as those caused by a variation of the voltage of the supply system in relation to the rated voltage.

One object of the present addition is so to design the discharge circuit for the memory accumulator as to obviate the aforesaid disadvantages.

The invention relates to an apparatus for recharging an emergency storage battery used in the event of failure of a normal supply circuit, consisting of an alternating-current supply system, associated with a charger having input terminals connected to the said alternating-current supply system and output terminals connected to the said battery, the said charger having a high charging rate and a low charging rate, a memory accumulator, of low capacity as compared with the storage battery and adapted to be charged by means of the storage battery during the periods of interruption of the alternating-current supply, and setting, during the time of its discharge in a discharge circuit, the charge of the storage battery at the high rate, the apparatus comprising means for producing a voltage proportional to the current fed by the battery into the load, an electronic direct-current amplifier for amplifying this voltage, and means for converting it into a direct charging current, the intensity of which is proportional to the said voltage even at the low values of the said voltage, the said direct charging current passing through the said memory accumulator for the purpose of charging it proportionally to the current fed out by the storage battery, and only when the latter feeds into the load. The invention provides means to ensure that the intensity of the discharge of the memory accumulator is proportional to the intensity of the charging of the accumulator battery.

The invention will be readily understood from the description of various embodiments given in the following, by way of illustration but without limitation thereto, with reference to the accompanying drawings, in which.

DETAILED DESCRIPTION

Figure 1:
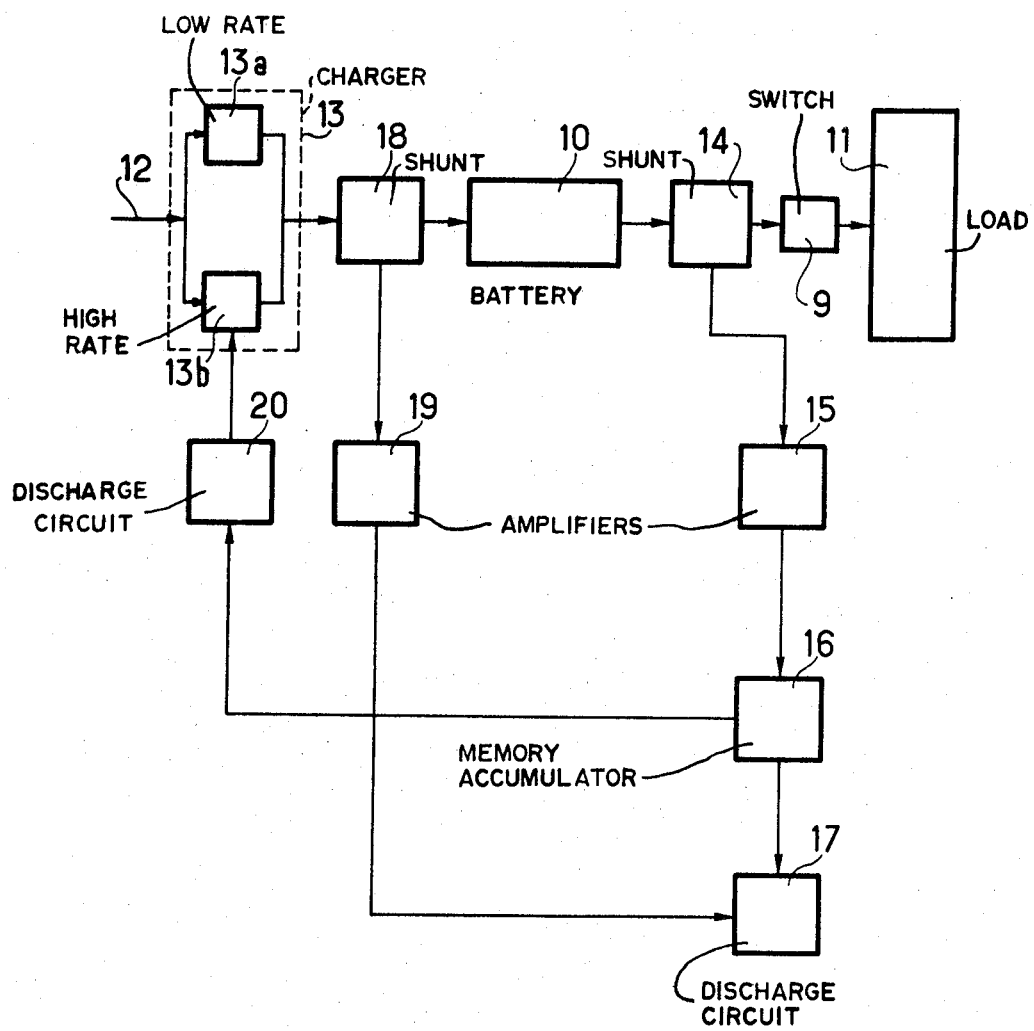
FIG. 1 is a synoptic diagram of the recharging device according to the invention.

In FIG. 1, the block 10 represents an emergency storage battery intended to supply a load 11.

A charger 13, comprising a low-rate charging circuit 13a and a high rate charging circuit 13b, receives a current supplied by an a-c power supply system 12 and is connected to the input of the battery 10.

A shunt 14 is inserted in series in the discharge circuit of the battery. There is set up across the terminals of the said shunt, in the course of the discharge of the battery (in the event of a breakdown of the supply system, setting in operation a cut-out member 9), a voltage proportional to the discharge current of the battery. This voltage is amplified by an amplifier 15. There is produced from the resulting amplified voltage a current proportional to the said voltage, and therefore proportional to the discharge current of the storage battery 10 which in turn charges a memory accumulator 16.

The memory accumulator 16, therefore, receives a charge proportional to the discharged ampere-hours of the storage battery 10.

When the normal a-c supply is restored in supply system 12, the memory accumulator 16 discharges into a discharge circuit 17.

In accordance with the invention, the discharge current of the memory accumulator 16 is proportional to the charging current received by the storage battery 10.

To this end, a shunt 18 is disposed in series in the charging circuit of the storage battery 10. The voltage across the terminals of the said shunt is amplified by an amplifying circuit 19. The output voltage of the amplifying circuit 19 is employed to modify the intensity of the discharge of the memory accumulator 16. This function is symbolically represented by the connecting link between the rectangle 19 and the rectangle 17.

At the end of the discharge of the memory accumulator 16, the voltage drop of the latter is utilized to stop the rapid-rate charging of the storage battery, by means of a control circuit symbolically represented by the rectangle 20 in FIG. 1.

Figure 2:
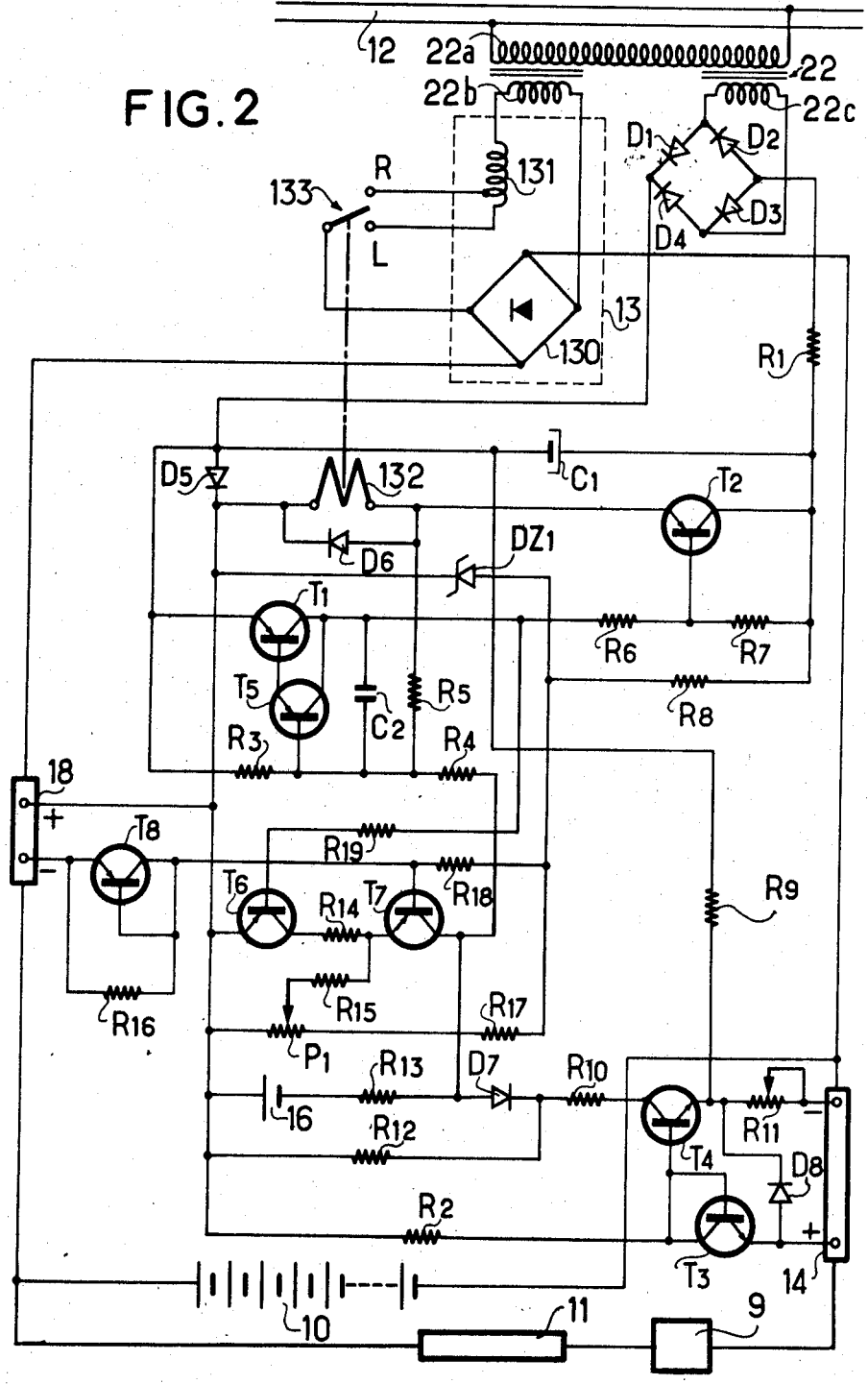
FIG. 2 is a detailed electric circuit diagram of one embodiment of the device or apparatus.

A preferred embodiment of the invention is illustrated in detail in FIG. 2. Therein:

An alternating-current supply system 12 feeds a charger 13 through a transformer 22 having a primary winding 22a and a first secondary winding 22b.

The charger 13 comprises a rectifier bridge 130. The secondary winding 22b of the transformer 22 is connected to the bridge 130 through an inductance 131 having an intermediate tap. A relay having a coil 132 and a contact 133 is provided to effect switching from a charging at a high rate or a charging at a low rate of the battery 10 by charger 13. The output of the charger 13 is connected to the storage battery 10. The load 11 is connected to the battery 10 through a cut-out member 9.

When the a.c. voltage of the supply system 12 is present, the emergency battery 10 is continuously charged at the slow rate. In the event of a failure of the supply system, the battery 10 supplies the energy to the load.

On restoration of the voltage in the supply system 12, a high rate charge is first applied to the battery, followed by a low-rate charge (or maintenance charge).

The case of a breakdown of the a-c supply system 12 will first be considered.

In the event of the voltage of the supply system 12 being absent, the storage battery 10 supplies the electric energy to the load 11. This battery 10 discharges; it is necessary to memorize the quantity of energy supplied by the battery 10 during the period of its discharge, in order that it may be subsequently recharged, without overcharge or undercharge. This memorization is effected by means of a small accumulator 16 which receives an electric current whose intensity is proportional to that of the current discharged by the storage battery 10 while the latter is supplying the load 11. For this purpose, a shunt 14 is connected to the discharge circuit of the battery, in series with the latter. Connected to the terminals of the shunt 14 is a circuit comprising an adjustable resistor R11 and two NPN transistors T3 and T4, the bases of which are electrically connected and which are in good thermal contact with one another, thus forming a balanced and temperature-compensated arrangement.

The collector of the transistor T4 is connected to the negative terminal of the accumulator 16 through a resistor R10, a diode D7 and a resistor R13. The collector of the transistor T3 is connected by a resistor R2 to the positive terminal of the accumulator 16.

The voltage threshold of the transistor T3, which is employed as a diode because its base and its collector are connected by a short-circuit, is opposed to the voltage threshold of the emitter-base junction of the transistor T4 and cancels it out. Consequently, the transistor starts to conduct current at a very low voltage across the terminals of the shunt 14. The resistor R11 defines the charging current of the memory accumulator 16 as a function of the voltage across the terminals of the shunt 14.

The resistor R10 limits the strength of the charging current of the memory accumulator 16, while the resistor R2 supplies the bias current of the transistors T3 and T4. The resistor R13 serves to measure the charging current and the discharge current of the memory accumulator 16 in the course of the adjustment.

In practice, the response linearity of the apparatus, i.e., the proportionality between the intensity of the charging current of the memory accumulator 16 and the voltage across the terminals of the shunt 14 is very satisfactory when the voltage across the terminals of the shunt 14 remains, for example, between 50 and 300 millivolts.

The capacity stored in the memory accumulator 16 is proportional to that discharged by the battery 10 within the aforesaid limits.

When the voltage across the terminals of the shunt 14 exceeds 300 millivolts, the resistors R10 and R13 limit the intensity of the charging current of the memory accumulator 16.

When the voltage across the terminals of the shunt falls below 50 millivolts, the intensity of the charging current of the accumulator 16 is no longer proportional to the said voltage.

This current is completely zero when the voltage across the terminals of the shunt 14 is between 0 and 20 millivolts, because the rest current of the apparatus than flows through the resistor R12, but without discharging the memory accumulator 16, by reason of the presence of the one-way diode D7.

The caliber of the shunt must be defined for operation in the linear portion of the aforesaid characteristic (charging current of the memory-accumulator 16 voltage across the terminals of the shunt 14).

In practice, assuming that the emergency battery 10 operates for one hour, there is provided a shunt 14 which supplies at its terminals a voltage of 300 millivolts for the corresponding intensity of the discharge current of the battery 10.

The person skilled in the art can readily modify the caliber of the shunt 14, as well as the resistor R11, if the operating conditions are different.

When the supply system 12 becomes operative again, the battery 10 is recharged. In order to obtain first a high charging rate, as defined in the foregoing, and then a low charging rate, the charging circuit of the battery 10 comprises various elements which are described in the following:

A rectifier bridge, comprising the diodes D1 to D4, is fed by the supply system 12 through a second secondary winding 22C of the transformer 22 and supplies a voltage which is filtered by a resistor R1 and a capacitor C1.

This voltage is supplied to the terminals of the coil 132 of the relay controlling one or other of the charging rates of the battery 10. The coil 132 is in series with a transistor T2, the base of which is biased by a voltage taken from between two resistors R6 and R7. A transistor T1 is in series with the resistor R6.

A circuit for the discharge of the memory accumulator 16 comprises a potentiometer P1 in series with a resistor R17, a resistor R15 and a transistor T7. The base of the transistor T7 is biased by the voltage across the terminals of a shunt 18, which is in series between the charger 13 and the battery 10, and through which the charging current of the battery 10 therefore flows. The voltage across the terminals of the shunt 18 is therefore proportional to the charging current of the battery 10.

A transistor T8 employed as a diode, whose voltage threshold is opposed to the threshold of the emitter-base junction of the transistor T7, effects the temperature compensation of the circuit. A resistor R16 applies to the base of the transistor T7 the potential of the negative terminal of the shunt in the absence of the normal supply, and it has the effect of avoiding a harmful discharge of the memory accumulator 16 when the normal supply is absent in supply source 12.

The collector of the transistor T8 is connected to the base of the transistor T7, while its emitter is connected to the negative pole of the shunt 18.

The collector of the transistor T7 is connected to the negative pole of the memory accumulator 16 through the measuring resistor R13.

The apparatus of FIG. 2 operates as follows:

The bias of the transistor T7 and the voltage across the terminals of the resistor R15 are proportional to the intensity of the current flowing through the shunt 18. The strength of the discharge current of the memory accumulator 16, defined by the voltage across the terminals of the resistor R15, is therefore proportional to the strength of the charging current of the storage battery 10.

As long as the voltage of the memory accumulator 16 is sufficient, the transistors T5 and T1, biased by the resistors R3 and R4, and the transistor T2, biased by the resistors R6 and R7, are conductive. A current flows through the coil 132 of the relay, the contact of which is then brought to and maintained in the position marked R, thus ensuring charging of the battery 10 at the high rate.

As the completion of the discharge of the memory accumulator 16 approaches, the voltage of the latter decreases. When it reaches a given minimum value (about 0.8 V if the memory accumulator is a low capacity alkaline electrolyte accumulator), the transistors T5 and T1 tend to become non-conductive and cause the transistor T2 to become non-conductive. The current decreases in the resistor R5 connecting the collector of T2 to the junction point of R3 and R4, and the bias of the transistors T1 and T5 also decreases.

This cumulative effect results in a sudden fall in the intensity of the current flowing through the coil 132 of the relay, which releases and causes the contact 132 to change to the position denoted by L, which then brings the accumulator battery 10 under a slow charge.

At the same time, a transistor T6 connects a resistor R14 in parallel with the resistor R15. This has the effect of increasing the intensity of the discharge current of the memory accumulator 16, which enables the voltage of the memory accumulator 16 to continue to decrease and hence to avoid successive operations of the relay controlled by coil 132.

The rest current of the charging circuit of the memory accumulator is cancelled out, when the voltage of the supply system is present, through a resistor R9 disposed as shown in FIG. 2.

The relay is provided with a diode D6, which shunts its coil 132, and which is intended to short-circuit the break current surge.

The type of charger whose construction and operation have just been described is very suitable for dealing with the problem. The variations of the charging intensity of the battery as a function of the variations of the voltage of the supply system and of the variations of the voltage of the battery are compensated for by the duration of the charging at high rate, since the ampere-hours charged into the storage battery 10 are proportional to the ampere-hours discharged by the memory accumulator 16, the discharge intensity of the memory accumulator remaining proportional to the charging intensity of the storage battery.

A further advantage of the present apparatus is that the voltage drop at the end of the discharge of the memory accumulator is rendered much more rapid than in the apparatus according to the hereinabove mentioned earlier proposals.

Another advantage is that the effect of the temperature variations on the whole apparatus is negligible.

Figure 3:
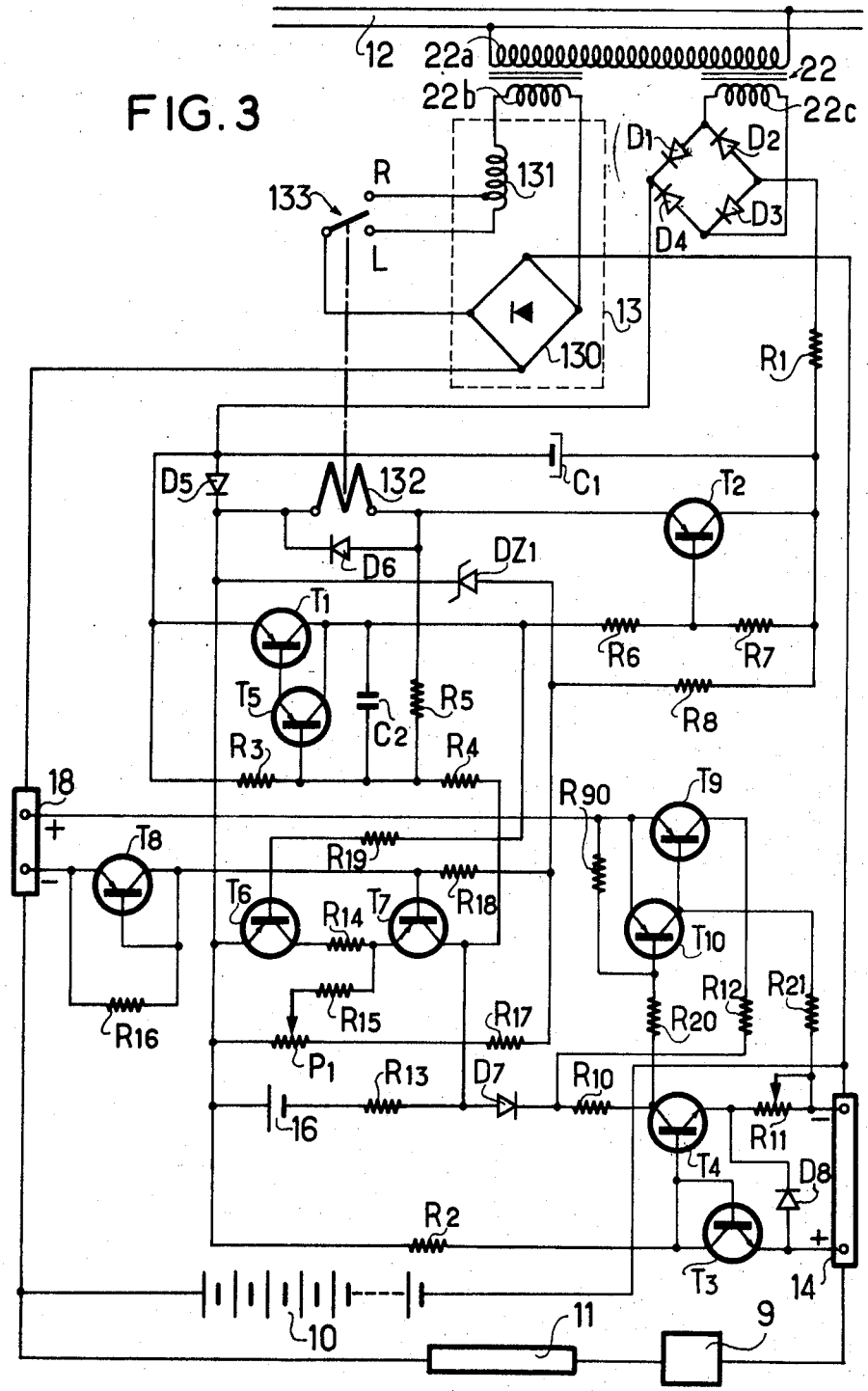
FIG. 3 is a circuit diagram of a variant.

FIG. 3 illustrates a variant of the apparatus of FIG. 2, like elements in the two figures being denoted by like references.

In the arrangement according to FIG. 2, the rest current of the transistor T4 flows through a resistor R12.

By reason of the continuous presence of this resistor, the ratio of the ampere-hours charged in the memory accumulator 16 to the ampere-hours in discharge supplied by the battery is a little too low for a reduced discharge intensity of the accumulator battery and a little too high for a considerable discharge intensity.

The improvement as compared with the circuit of FIG. 2 resides in the provision of an associated circuit which makes it possible to connect the resistor 12 when it is necessary and to remove it when its presence is troublesome. This associated circuit comprises the transistors T9 and T10 and the resistors R90, R20 and R21. In this case, the resistor R12 is connected between the common point of the diode D7 and the resistor R10, on the one hand, and the collector of the transistor T9 on the other hand. This transistor T9 is connected in series with the resistor R12 and its emitter is connected to the positive terminal of the shunt 18.

The base of the transistor T9 is connected to the collector of the transistor T10, the emitter of which is connected to the emitter of the transistor T9.

The base of the transistor T10 is biased by the resistor bridge R90, R20.

The collector of the transistor T10 is connected by the resistor R21 to the negative pole of the shunt 14. The circuit operates as follows:

When a very weak current flows through the shunt 14, the transistor T4 is almost completely non-conductive. The transistor T10 then is also non-conductive. The transistor T9 is conductive and the rest current of the transistor T4 flows through the resistor R12. When the voltage across the terminals of the shunt 14 reaches a certain value (20 mV in the example chosen in the foregoing), the transistor T4 is rendered conductive and a current (of the order of several milliamperes) flows through it. The transistor T10, whose base is biased by the bridge R20, R90, becomes conductive and renders the transistor T9 non-conductive.

The current supplied by the transistor T4 is no longer passed through the resistor R12 and it effects the charging of the memory accumulator 16. It is to be noted that the current flowing through the resistor R20 is about 1/100 of the current of the transistor T4, i.e., of negligible value, so that the memory accumulator 14 is charged with very good efficiency.

Otherwise operation of the circuit of FIG. 3 is the same as that of FIG. 2.

The two embodiments described and illustrated may undergo certain modifications in detail within the scope of the appended claims without departing from the scope of the invention.

The invention is applicable notably to standby electric circuits.

What is claimed is:

1. Device for recharging an emergency storage battery used in the event of breakdown of a normal supply circuit to said load comprising an alternating-current supply system, a charger associated with said system and having input terminals connected to the said alternating-current supply system and output terminals connected in a charging circuit to the said battery, the said charger having a high charging rate and a low charging rate, a memory accumulator, of low capacity in relation to the capacity of said storage battery and adapted to be charged from the storage battery during the periods of interruption of the alternating-current from supply circuit and to set, during the time of its discharge in a discharge circuit, the charge of the storage battery at the high rate, and further comprising means for producing a voltage proportional to current supplied by the battery to the load, an electronic direct-current amplifier for the amplification of said voltage, and means for converting it into a direct charging current whose intensity is proportional to the said voltage even at the low values of the said voltage, the said direct charging current passing through the said memory accumulator for the purpose of charging it proportionally to the current supplied by the storage battery, and only when the latter feeds into the load, and comprising finally means to ensure that the discharge intensity of the memory accumulator is proportional to the charging intensity of the storage battery.

2. Device according to claim 1, in which the said last-named means comprise a device for detecting the charging intensity of the battery in its charging circuit and supplying a signal proportional to the said intensity, the said signal acting on an impedance in the discharge circuit of the memory accumulator.

3. Device according to claim 2, in which the said detecting means comprises a shunt inserted in the charging circuit of the storage battery for controlling the discharge circuit of said memory accumulator, the said signal, consisting of the voltage across the terminals of the shunt and amplifying means for said voltage.

4. Device according to claim 3, in which the said discharge circuit comprises a variable resistance consisting of a first transistor controlled as a function of the voltage across the terminals of the shunt.

5. Device according to claim 4, in which a second transistor, arranged as a diode, in thermal contact with the first transistor, is connected to the first transistor in such manner that its voltage threshold is opposed to the voltage threshold of the first transistor.

6. Device according to claim 1, in which means are provided to modify the ratio of proportionality between the discharge current of the memory accumulator and the charging current of the storage battery after a change of the charging rate.

7. Device for recharging a storage battery, intended to feed a standby load via a discharge circuit, the said apparatus comprising a first shunt inserted in the electric discharge circuit of the said battery, which effects the transformation of the continuous current flowing through it into a continuous voltage applied to at least a first transistor stage or equivalent stage, which supplies the current which charges a small accumulator which performs the function of a memory and whose discharge in a second discharge circuit serves as a timing means for controlling the change from the high charging rate to the low charging rate of the battery, the said transistor stage comprising two transistors which effect a mutual temperature compensation, the said two transistors, one of which is used as a diode, being in mutual thermal contact, having their bases electrically connected and being connected in such manner that the emitter of the transistor employed as a diode is directly connected to one end of the said first shunt, while the emitter of the other transistor is connected through a first resistor to the other end of the said first shunt, with the result that the collector current of the transistor not employed as a diode, which charges the memory accumulator, is proportional to the discharge current of the battery which flows through the said first shunt, the said discharge circuit of the memory accumulator comprising a second shunt inserted in the electric circuit of the said battery, to the terminals of which there is connected the discharge circuit of the memory accumulator which latter circuit comprises in series the said memory accumulator, and a second transistor stage comprising a third transistor connected as a diode, whose emitter is connected to a first terminal of the second shunt, and a fourth transistor whose base is connected to the collector of the third transistor and whose emitter is connected to one end of a resistor whose other end is connected to the other terminal of the second shunt, the third and fourth transistors being in mutual thermal contact and temperature-compensating one another, with the result that the discharge current of the memory accumulator is proportional to the charging current of the storage battery, a fifth transistor connecting a third resistor in parallel with the second transistor which has the effect of increasing the proportionality ratio between the discharge current of the memory accumulator and the charging current of the storage battery.

8. Recharging device according to claim 7, in which said fourth resistor is connected in series with the first transistor stage in order to drain the rest current from this stage.

9. Recharging device according to claim 7, which comprises said third transistor stage disposed between the first transistor stage and a terminal of the second shunt which connects a fourth resistor in series with the first transistor stage, the rest current of the first transistor stage flowing through the latter resistor when the said last-named stage is non-conductive, and the said resistor being eliminated when the first stage is conductive.

* * * * *